US010031797B2

(12) United States Patent
Hui

(10) Patent No.: US 10,031,797 B2
(45) Date of Patent: Jul. 24, 2018

(54) METHOD AND APPARATUS FOR PREDICTING GPU MALFUNCTIONS

(71) Applicant: Alibaba Group Holding Limited, Georgetown, Grand Cayman (KY)

(72) Inventor: Fei Hui, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 168 days.

(21) Appl. No.: 15/054,948

(22) Filed: Feb. 26, 2016

(65) Prior Publication Data
US 2016/0253230 A1 Sep. 1, 2016

(30) Foreign Application Priority Data

Feb. 26, 2015 (CN) .......................... 2015 1 0088768

(51) Int. Cl.
*G06F 11/07* (2006.01)
*G06T 1/20* (2006.01)
*G06F 11/00* (2006.01)

(52) U.S. Cl.
CPC .......... *G06F 11/079* (2013.01); *G06F 11/008* (2013.01); *G06F 11/076* (2013.01); *G06F 11/0721* (2013.01); *G06T 1/20* (2013.01); *G06T 2200/28* (2013.01)

(58) Field of Classification Search
CPC .. G06F 11/3058; G06F 11/008; G06F 11/073; G06F 11/0754
USPC ........................................................ 714/47.2
See application file for complete search history.

(56) References Cited

U.S. PATENT DOCUMENTS

| 6,286,992 | B1* | 9/2001 | Kyrtsos .................... B61K 9/06 374/104 |
| 6,308,138 | B1* | 10/2001 | Jones .................. G05B 19/4065 700/174 |
| 7,600,155 | B1* | 10/2009 | Nickolls ................. G06F 11/36 714/38.13 |
| 8,924,752 | B1* | 12/2014 | Law ....................... G06F 1/3206 713/322 |
| 2004/0225911 | A1* | 11/2004 | Smith ................. G06F 11/2257 714/47.3 |
| 2006/0259616 | A1* | 11/2006 | Lester ................. H04L 12/2856 709/224 |
| 2009/0106571 | A1 | 4/2009 | Low et al. |
| 2010/0118019 | A1 | 5/2010 | Cases et al. |
| 2010/0306598 | A1* | 12/2010 | Ackaret ................ G06F 11/073 714/47.1 |
| 2011/0246093 | A1* | 10/2011 | Wood .................... G06F 11/008 702/34 |
| 2011/0313693 | A1 | 12/2011 | Inoue et al. |

(Continued)

Primary Examiner — Kamini B Patel

(57) ABSTRACT

A method of predicting GPU malfunctions includes installing a daemon program at a GPU node, the daemon program periodically collecting GPU status parameters corresponding to the GPU node at a pre-determined time period. The method also includes obtaining the GPU status parameters from the GPU node and comparing the obtained GPU status parameters with mean status fault parameters to determine whether the GPU is to malfunction, where the mean status fault parameters are obtained by use of a pre-configured statistical model. Prior to a GPU enters a malfunction state, the GPU can be replaced, or the programs executing on the GPU can be migrated to other GPUs for execution, without affecting the normal business operations.

20 Claims, 8 Drawing Sheets

(56) References Cited

U.S. PATENT DOCUMENTS

| | | |
|---|---|---|
| 2013/0138419 A1 | 5/2013 | Lopez et al. |
| 2013/0275582 A1 | 10/2013 | Gedam et al. |
| 2014/0067779 A1* | 3/2014 | Ojha ................ G06F 17/30144 |
| | | 707/694 |
| 2014/0092103 A1* | 4/2014 | Saulters ................ G06F 15/00 |
| | | 345/501 |
| 2014/0266678 A1 | 9/2014 | Shapiro et al. |
| 2014/0269344 A1 | 9/2014 | Mie et al. |
| 2014/0270093 A1 | 9/2014 | Lum et al. |
| 2014/0351642 A1 | 11/2014 | Bates et al. |
| 2015/0007713 A1 | 1/2015 | Aki |
| 2015/0046756 A1 | 2/2015 | Sreekumaran et al. |
| 2015/0074450 A1* | 3/2015 | Blount ................ G06F 11/0727 |
| | | 714/6.1 |
| 2015/0074452 A1 | 3/2015 | Tsukahara et al. |
| 2015/0106058 A1 | 4/2015 | Mazzaro |
| 2015/0113337 A1 | 4/2015 | Otsuka et al. |
| 2015/0119729 A1 | 4/2015 | Dumont et al. |
| 2015/0149096 A1 | 5/2015 | Soykan |
| 2015/0167454 A1 | 6/2015 | Kale et al. |
| 2015/0189074 A1 | 7/2015 | Lum et al. |
| 2015/0193126 A1 | 7/2015 | Whalley |
| 2015/0253714 A1 | 9/2015 | Amazeki et al. |
| 2015/0261474 A1 | 9/2015 | Vorbach et al. |
| 2015/0261630 A1 | 9/2015 | Endo |
| 2015/0277964 A1 | 10/2015 | Atkins |
| 2015/0300889 A1* | 10/2015 | Ramaraju ................ G01K 7/01 |
| | | 374/170 |
| 2015/0344149 A1 | 12/2015 | Mumaw et al. |
| 2015/0347211 A1 | 12/2015 | Dang et al. |
| 2015/0372895 A1 | 12/2015 | Prasanna Kumar et al. |
| 2016/0000338 A1 | 1/2016 | Zhang et al. |
| 2016/0010628 A1 | 1/2016 | Dhar et al. |
| 2016/0034362 A1 | 2/2016 | Al-Wahabi et al. |
| 2016/0038093 A1 | 2/2016 | Sharma et al. |
| 2016/0041887 A1 | 2/2016 | Davis et al. |
| 2016/0047696 A1* | 2/2016 | Ramaraju ................ G01K 7/01 |
| | | 374/170 |
| 2016/0055280 A1 | 2/2016 | Devoy et al. |
| 2016/0006977 A1 | 3/2016 | Sahu |
| 2016/0061035 A1 | 3/2016 | Siegrist et al. |
| 2017/0235622 A1* | 8/2017 | Boyapalle ............ G06F 11/079 |
| | | 714/47.2 |

* cited by examiner

METHOD AND APPARATUS FOR PREDICTING GPU MALFUNCTIONS

CROSS REFERENCE TO RELATED APPLICATION

This application claims the benefits to Chinese Patent Application No. 201510088768.3, filed on Feb. 26, 2015, which is incorporated herein by reference in its entirety.

TECHNICAL FIELD

The present invention relates generally to the field of computer communication technologies, and more particularly to a method and apparatus for predicting GPU malfunctions.

BACKGROUND

With the development of the computer communication technologies, the utilization of graphics processing units (GPUs) in the general computing field is becoming wider and wider. Equipped with hundreds of computing cores, a GPU can achieve a computing power in terms of tera floating-points operations per second (TFLOPS). For general computing purposes, the powerful floating-points computation capacity of a GPU is beyond comparable with that of a CPU. Therefore, the general computing power of a GPU can be utilized to compensate the deficiency of a CPU in parallel computing.

In order to monitor the status of each GPU of a GPU cluster, the current technology deploys daemon programs for each GPU node, the daemon program collecting the GPU information about such as the GPU model, temperature, power consumption, usage duration, usage status, etc. The daemon program also displays the collected GPU information. Based on the collected GPU information, it is determined whether there are occurrences of errors or failures with regard to the GPU; and if so, alerts are generated accordingly.

With the current technology, it is only upon the detection of faults with a GPU that a user is alerted with the GPU malfunctioning. It is also at this point of time that the user replaces the faulty GPU, or migrates the programs executing on the faulty GPU to some other normal functioning GPUs for execution, imposing negative impact on the normal business operations.

SUMMARY

In order to solve the current technical problem, the present disclosure provides for a method and apparatus for predicting GPU malfunctions. Prior to a GPU enters a malfunction state, status parameters and mean status fault parameters are utilized to determine whether a GPU is about to malfunction such that a malfunction state of the GPU can be predicted. Consequently, prior to the GPU enters a malfunction state, the GPU can be replaced, or the programs executing on the GPU can be migrated to other GPUs for execution, without affecting the normal business operations.

According to an exemplary embodiment of the present disclosure, a method of predicting GPU malfunctions includes installing a daemon program at a GPU node, the daemon program periodically collecting the GPU status parameters corresponding to the GPU node at a pre-determined time period. The method also includes obtaining the GPU status parameters from the GPU node. The method further includes comparing the obtained GPU status parameters with mean status fault parameters to determine whether the GPU is to malfunction, where the mean status fault parameters are obtained by use of pre-configured statistical models.

Alternatively, when the status parameter is temperature, the comparing of the obtained GPU status parameters with mean status fault parameters to determine whether the GPU is to malfunction includes performing statistics to obtain a temperature count of a number of times the GPU incurs a temperature greater than a pre-determined temperature threshold and a GPU temperature standard deviation threshold for the GPU. The comparing also includes comparing the obtained temperature count with a mean temperature fault count and comparing a GPU temperature fault standard deviation with the GPU temperature standard deviation threshold. The comparing further determines that, if the temperature count is greater than the mean temperature fault count, and if the GPU temperature fault standard deviation is less than the GPU temperature standard deviation threshold, the GPU is to malfunction. Otherwise, if the temperature count is less than the mean temperature fault count, or if the GPU temperature fault standard deviation is greater than the GPU temperature standard deviation threshold, the comparing determines that the GPU is not to malfunction.

Further alternatively, the GPU status parameters collected from the GPU node include a GPU model, temperature, and usage status. The mean status fault parameters are obtained by use of a pre-configured statistical model through the following steps. First, it is determined, based on the usage status, whether the GPU malfunctions. Second, in response to a determination that the GPU does not malfunction, based upon the GPU model, the temperature collected from the GPU node is stored in an information storage space corresponding to the GPU model. In response to a determination that the GPU does malfunction, based on the GPU model, the stored temperatures are obtained from an information storage space corresponding to the GPU model. Based on the temperature collected from the GPU node and the stored temperatures obtained from the storage space corresponding to the GPU model, statistics are performed to compute an arithmetic mean temperature fault count and a GPU temperature fault standard deviation, by use of a pre-configured temperature statistical model.

Still further alternatively, the pre-configured temperature statistical model includes a mean temperature fault count model configured to compute an arithmetic mean based on the GPU temperature collected from the GPU node and the stored GPU obtained from the information storage space corresponding to the GPU model. The pre-configured temperature statistical model also includes a temperature fault standard deviation model configured to compute a temperature fault standard deviation based on the GPU temperature collected from the GPU node and the stored GPU temperatures obtained from the information storage space corresponding to the GPU model, and the mean temperature fault count.

Yet further alternatively, when the status parameter is power consumption, the comparing of the obtained GPU status parameters with mean status fault parameters to determine whether the GPU is to malfunction includes performing statistics to obtain a power consumption count of a number of times the GPU incurs power consumption greater than a pre-determined power consumption threshold and a GPU power consumption standard deviation threshold for the GPU. The comparing also includes comparing the obtained power consumption count with a mean power consumption fault count and comparing a GPU power consumption fault standard deviation with the GPU power consumption standard deviation threshold. The comparing further determines that, if the power consumption count is greater than the mean power consumption fault count, and if the GPU power consumption fault standard deviation is less than the GPU temperature standard deviation threshold, the GPU is to malfunction. Otherwise, if the temperature count is less than the mean temperature fault count, or if the GPU power consumption fault standard deviation is greater than the GPU power consumption standard deviation threshold, the comparing determines that the GPU is not to malfunction.

Further alternatively, the GPU status parameters collected from the GPU node include a GPU model, power consumption, and usage status. The mean status fault parameters are obtained by use of a pre-configured statistical model through the following steps. First, it is determined, based on the usage status, whether the GPU malfunctions. Second, in response to a determination that the GPU does not malfunction, based upon the GPU model, the power consumption collected from the GPU node is stored in an information storage space corresponding to the GPU model. In response to a determination that the GPU does malfunction, based on the GPU model, stored power consumption are obtained from an information storage space corresponding to the GPU model. Based on the power consumption collected from the GPU node and the stored power consumption obtained from the storage space corresponding to the GPU model, statistics are performed to compute an arithmetic mean power consumption fault count and a power consumption fault standard deviation, by use of a pre-configured power consumption statistical model.

Still further alternatively, the pre-configured power consumption statistical model includes a mean power consumption fault count model configured to compute an arithmetic mean based on the GPU power consumption collected from the GPU node and the stored GPU power consumption obtained from the information storage space corresponding to the GPU model. The pre-configured power consumption statistical model also includes a power consumption fault standard deviation model configured to compute a power consumption standard deviation based on the GPU power consumption collected from the GPU node and the stored GPU power consumption obtained from the information storage space corresponding to the GPU model, and the mean power consumption fault count.

Alternatively, when the status parameter is usage duration, the comparing the obtained GPU status parameters with mean status fault parameters to determine whether the GPU is to malfunction includes comparing the obtained GPU usage duration with a mean fault usage duration. The comparing further determines that, if the GPU usage duration is greater than the mean fault usage duration, the GPU is to malfunction. Otherwise, if the GPU usage duration is less than the mean fault usage duration, the comparing determines that the GPU is not to malfunction.

Further alternatively, the GPU status parameters collected from the GPU node include a GPU model, usage duration, and usage status. The mean status fault parameters are obtained by use of a pre-configured statistical model through the following steps. First, it is determined, based on the usage status, whether the GPU malfunctions. Second, in response to a determination that the GPU does not malfunction, based upon the GPU model, the usage duration collected from the GPU node is stored in an information storage space corresponding to the GPU model. In response to a determination that the GPU does malfunction, based on the GPU model, the stored usage duration is obtained from an information storage space corresponding to the GPU model, and based on the usage duration collected from the GPU node and the stored usage duration obtained from the storage space corresponding to the GPU model, statistics are performed to compute an arithmetic mean fault usage duration, by use of a pre-configured usage duration statistical model.

Still further alternatively, the pre-configured usage duration statistical model includes a mean fault usage duration model configured to compute an arithmetic mean based on the GPU usage duration collected from the GPU node and the stored GPU usage duration obtained from the information storage space corresponding to the GPU model.

According to another exemplary embodiment of the present disclosure, an apparatus for predicting GPU malfunctions includes an installation module, a collecting module and a processing module. The installation module is configured to install a daemon program at a GPU node, the daemon program periodically collecting GPU status parameters corresponding to the GPU node at a pre-determined time period. The collecting module is configured to obtain the GPU status parameters from the GPU node. The processing module is configured to compare the obtained GPU status parameters with mean status fault parameters to determine whether the GPU is to malfunction, where the mean status fault parameters are obtained by use of a pre-configured statistical model.

Alternatively, when the status parameter is temperature, the processing module includes a first statistical module, a first comparison module, a first determination module and a second determination module. The first statistical module is configured to perform statistics to obtain a temperature count of a number of times the GPU incurs a temperature greater than a pre-determined temperature threshold and a GPU temperature standard deviation threshold for the GPU. The first comparison module is configured to compare the obtained temperature count with a mean temperature fault count and to compare a GPU temperature fault standard deviation with the GPU temperature standard deviation threshold. The first determination module is configured to, if the temperature count is greater than the mean temperature fault count, and if the GPU temperature fault standard deviation is less than the GPU temperature standard deviation threshold, determine that the GPU is to malfunction. The second determination module is configured to, if the temperature count is less than the mean temperature fault count, or if the GPU temperature fault standard deviation is greater than the GPU temperature standard deviation threshold, determine that the GPU is not to malfunction.

Further alternatively, after the installation module installs the daemon programs on the GPU node, the daemon program periodically collects the GPU model and GPU status parameters corresponding to the GPU node at a pre-determined time period. The collecting module includes a first collecting module configured to collect from the GPU node a GPU model, temperature and usage status. The processing module further includes a first decision module, a first storing module and a first computing module. The first decision module is configured to decide, based on the usage status, whether the GPU malfunctions. The first storing module is configured to, in response to a determination that the GPU does not malfunction, based upon the GPU model, store the temperature collected from the GPU node in an information storage space corresponding to the GPU model. The first computing module is configured to, in response to a determination that the GPU does malfunction, based on the GPU model, obtain temperatures stored in an information storage space corresponding to the GPU model, and based on the temperature collected from the GPU node and the stored temperatures obtained from the storage space corresponding to the GPU model, perform statistics to compute an arithmetic mean temperature fault count and a temperature fault standard deviation, by use of a pre-configured temperature statistical model.

Still further alternatively, the pre-configured temperature statistical model includes a mean temperature fault count model configured to compute an arithmetic mean based on the GPU temperature collected from the GPU node and the stored GPU temperatures obtained from the information storage space corresponding to the GPU model. The pre-configured temperature statistical model also includes a temperature fault standard deviation model configured to compute a standard deviation based on the GPU temperature collected from the GPU node and the stored GPU temperatures obtained from the information storage space corresponding to the GPU model, and the mean temperature fault count.

Yet still alternatively, when the status parameter is power consumption, the processing module includes a second statistical module, a second comparison module, a third determination module and a fourth determination module. The second statistical module is configured to perform statistics to obtain a power consumption count of a number of times the GPU incurs power consumption greater than a pre-determined power consumption threshold and a GPU power consumption standard deviation threshold for the GPU. The second comparison module is configured to compare the obtained power consumption count with a mean power consumption fault count and to compare a GPU power consumption fault standard deviation with the GPU power consumption standard deviation threshold. The third determination module is configured to, if the power consumption count is greater than the mean power consumption fault count, and if the GPU power consumption fault standard deviation is less than the GPU power consumption standard deviation threshold, determine that the GPU is to malfunction. The fourth determination module is configured to, if the power consumption count is less than the mean power consumption fault count, or if the GPU power consumption fault standard deviation is greater than the GPU power consumption standard deviation threshold, determine that the GPU is not to malfunction.

Yet still further alternatively, after the installation module installs the daemon programs on the GPU node, the daemon program periodically collects the GPU model and GPU status parameters corresponding to the GPU node at a pre-determined time period. The collecting module includes a second collecting module configured to collect from the GPU node a GPU model, power consumption and usage status. The processing module further includes a second decision module, a second storing module and a second computing module. The second decision module is configured to decide, based on the usage status, whether the GPU malfunctions. The second storing module is configured to, in response to a determination that the GPU does not malfunction, based upon the GPU model, store the power consumption collected from the GPU node in an information storage space corresponding to the GPU model. The second computing module is configured to, in response to a determination that the GPU does malfunction, based on the GPU model, obtain power consumption stored in an information storage space corresponding to the GPU model, and based on the power consumption collected from the GPU node and the stored power consumption obtained from the storage space corresponding to the GPU model, perform statistics to compute an arithmetic mean power consumption fault count and a power consumption fault standard deviation, by use of a pre-configured power consumption statistical model.

Still further alternatively, the pre-configured power consumption statistical model includes a mean power consumption fault count model configured to compute an arithmetic mean based on the GPU power consumption collected from the GPU node and the stored GPU power consumption obtained from the information storage space corresponding to the GPU model. The pre-configured power consumption statistical model also includes a power consumption fault standard deviation model configured to compute a standard deviation based on the GPU power consumption collected from the GPU node and the stored GPU power consumption obtained from the information storage space corresponding to the GPU model, and the mean power consumption fault count.

Alternatively, when the status parameter is usage duration, the processing module includes a third comparison module, a fifth determination module and a sixth determination module. The third comparison module is configured to compare the obtained GPU usage duration with a mean fault usage duration. The fifth determination module is configured to, if the GPU usage duration is greater than the mean fault usage duration, determine the GPU is to malfunction. The sixth determination module is configured to, if the GPU usage duration is less than the mean fault usage duration, determine the GPU is not to malfunction.

Yet still further alternatively, after the installation module installs the daemon programs on the GPU node, the daemon program periodically collects the GPU model and GPU status parameters corresponding to the GPU node at a pre-determined time period. The collecting module includes a third collecting module configured to collect from the GPU node a GPU model, usage duration and usage status. The processing module further includes a third decision module, a third storing module and a third computing module. The third decision module is configured to decide, based on the usage status, whether the GPU malfunctions. The third storing module is configured to, in response to a determination that the GPU does not malfunction, based upon the GPU model, store the usage duration collected from the GPU node in an information storage space corresponding to the GPU model. The third computing module is configured to, in response to a determination that the GPU does malfunction, based on the GPU model, obtain usage duration stored in an information storage space corresponding to the GPU model, and based on the usage duration collected from the GPU node and the stored usage duration obtained from the storage space corresponding to the GPU model, perform statistics to compute an arithmetic mean fault usage duration, by use of a pre-configured usage duration statistical model.

Still further alternatively, the pre-configured usage duration statistical model includes a mean fault usage duration model configured to compute an arithmetic mean based on the GPU usage duration collected from the GPU node and the stored GPU usage duration obtained from the information storage space corresponding to the GPU model.

Compared to the current technology, the present disclosure provides for the following technical effects.

1) Prior to a GPU enters a malfunction state, status parameters and mean status fault parameters can be utilized to determine whether a GPU is about to malfunction such that a malfunction state of the GPU can be predicted.

Consequently, prior to the GPU enters a malfunction state, the GPU can be replaced, or the programs executing on the GPU can be migrated to other GPUs for execution, without affecting the normal business operations.

2) Prior to the GPU enters a malfunction state, the GPU temperature count and mean temperature fault count, power consumption count and mean power consumption fault count, or usage duration and mean fault usage duration, etc. can be utilized to determine whether the GPU is about to malfunction such that a malfunction state of the GPU can be predicted. Consequently, prior to the GPU enters a malfunction state, the GPU can be replaced, or the programs executing on the GPU can be migrated to other GPUs for execution, without affecting the normal business operations.

3) When the GPU temperature count and mean temperature fault count, temperature standard deviation threshold and temperature fault standard deviation are utilized to determine whether the GPU is about to malfunction, based on the GPU model, the mean temperature fault count and the temperature fault standard deviation corresponding to the GPU model can be obtained to enhance the GPU malfunction prediction accuracy.

4) When the GPU power consumption count and mean power consumption fault count, power consumption standard deviation threshold and power consumption fault standard deviation are utilized to determine whether the GPU is about to malfunction, based on the GPU model, the mean power consumption fault count and the power consumption fault standard deviation corresponding to the GPU model can be obtained to enhance the GPU malfunction prediction accuracy.

5) When the GPU usage duration and mean fault usage duration are utilized to determine whether the GPU is about to malfunction, based on the GPU model, the mean fault usage duration corresponding to the GPU model can be obtained to enhance the GPU malfunction prediction accuracy.

It should be appreciated by one having ordinary skills of the art that embodiments of the present disclosure do not need to implement or achieve all the above described technical effects.

DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

In the following description, numerous specific details are set forth in order to provide a thorough understanding of the present disclosure. However, it will become obvious to those skilled in the art that the present disclosure may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments mutually exclusive of other embodiments. Used herein, the terms "upper", "lower", "top", "bottom", "middle", "upwards", and "downwards" are intended to provide relative positions for the purposes of description, and are not intended to designate an absolute frame of reference. Further, the order of blocks in process flowcharts or diagrams representing one or more embodiments of the disclosure do not inherently indicate any particular order nor imply any limitations in the disclosure.

Embodiments of the present disclosure are discussed herein with reference to FIGS. 1-8. However, those skilled in the art will readily appreciate that the detailed description given herein with respect to these figures is for explanatory purposes as the disclosure extends beyond these limited embodiments.

Failure, failure conditions, faults, fault conditions, errors, malfunctions, malfunction states and malfunction conditions refer herein to any problem, error, fault, out of order or tolerable condition. Status fault parameters refer herein to the values of the status parameter associated with the faulty state caused by the status parameter. Temperature faults refer herein to malfunction states caused by temperature conditions. Power consumption faults refer herein to malfunction states caused by conditions related to power consumption. Usage duration faults refer herein to malfunction states caused by usages for certain durations.

Figure 1:
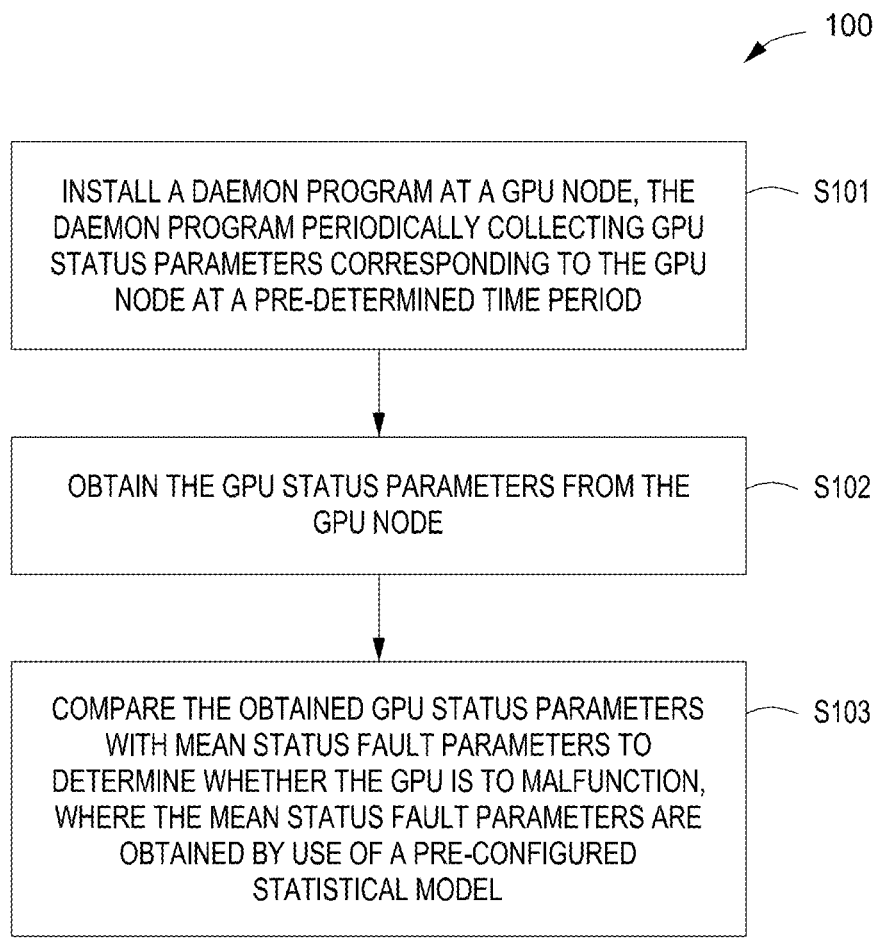
FIG. 1 is a flow chart of a first exemplary method of predicting GPU malfunctions in accordance with an embodiment of the present disclosure.

Referring to FIG. 1, a flow chart of a first exemplary method of predicting GPU malfunctions is shown in accordance with an embodiment of the present disclosure. The method 100 starts in step S101, where a daemon program is installed at a GPU node. The daemon program periodically collects status parameters corresponding to the GPU node accordingly to a pre-determined time period. In particular, a daemon program (e.g., aswp agent) installed for a GPU node periodically collects status parameters such as a GPU model, temperature, power consumption, usage duration and usage status, etc. corresponding to the GPU node, according to a pre-determined time period.

In step S102, the GPU status parameters are obtained from the GPU node. In step S103, the obtained GPU status parameters are compared to the mean status fault parameters, the result of which is utilized to determine whether the GPU is about to malfunction. The mean status fault parameters refer herein to the mean value of the status parameters that are associated with the fault conditions. The mean status fault parameters are obtained through pre-configured statistical models.

In particular, the mean status fault parameters can be pre-configured according to the prior practical experience. Alternatively, the mean status fault parameters can also be computed by use of the pre-configured statistical models to perform statistics over the status parameter data of the already faulty GPUs. The present embodiment focuses on how to utilize the pre-configured statistical models to generate mean status fault parameters based on the status parameter data of the GPUs that have already incurred faults or errors.

Figure 2:
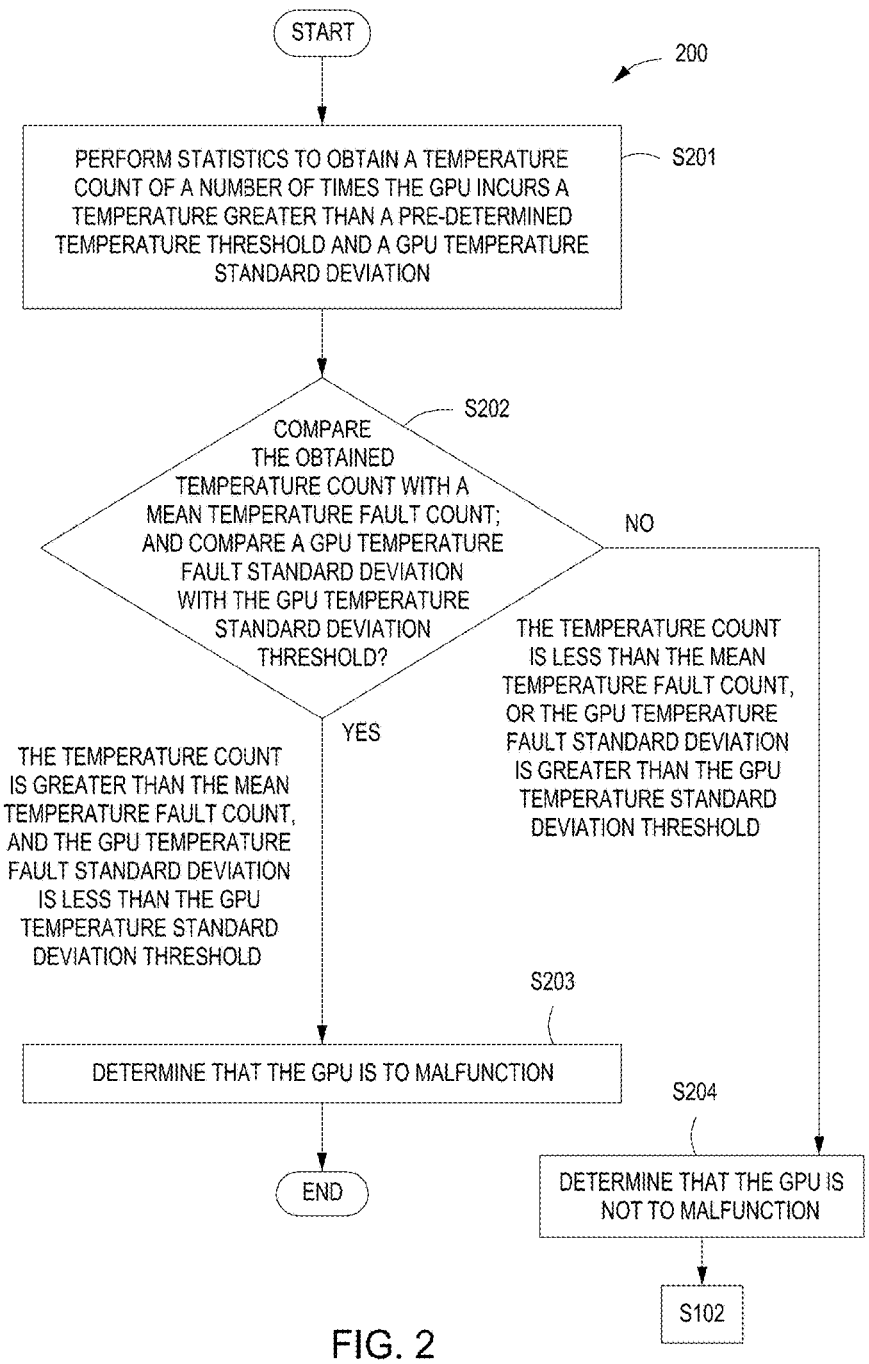
FIG. 2 is a flow chart of a second exemplary method of predicting GPU malfunctions in accordance with an embodiment of the present disclosure.

Referring to FIG. 2, a flow chart of a second exemplary method of predicting GPU malfunctions is shown in accordance with an embodiment of the present disclosure. In embodiments, the status parameter is temperature. Step S103, where the GPU status parameters are compared to the mean status fault parameters, the result of which is utilized to determine whether the GPU is about to malfunction, can include steps S201 through S204. Method 200 starts in step S201, where the number of times the GPU incurs a temperature greater than a pre-configured temperature threshold ("temperature count") is obtained. Further, the GPU temperature standard deviation threshold is also obtained.

In particular, it can be determined whether the GPU is to enter a malfunction state by use of only the GPU temperature count and the mean temperature fault count. In order to increase the accuracy of prediction, a temperature fault standard deviation and a temperature standard deviation threshold can be utilized in addition to predict GPU malfunctions. In other words, based upon the GPU temperature count, mean temperature fault count, as well as temperature fault standard deviation and temperature standard deviation threshold, it can be determined whether the GPU is about to malfunction.

Here, the pre-configured temperature threshold can be configured based on the information such as the maximal temperature the GPU can incur, or the like. The GPU temperature standard deviation threshold can be configured according to the practical use experience, or be configured based upon multiple experiments or the like. The pre-configured temperature threshold, GPU temperature standard deviation threshold can be stored in a one-to-one mapping relationship corresponding to the GPU in a correspondent storage space for retrieval at a time when such information is needed.

At step S202, the GPU temperature count is compared to the mean temperature fault count, the temperature fault standard deviation is compared to the temperature standard deviation threshold. If the GPU temperature count is greater than the mean temperature fault count, and the temperature fault standard deviation is less than the temperature standard deviation threshold, method 200 proceeds to step S203. If the GPU temperature count is less than the mean temperature fault count, or the temperature fault standard deviation is greater than the temperature standard deviation threshold, method 200 proceeds to step S204.

In particular, the mean temperature fault count can be configured based on the practical use experience. It can also be computed by use of statistical models to perform statistics of the status parameter data of the already faulty GPUs. For example, statistics can be performed for each faulty GPU to compute the temperature counts, i.e., the number of times the GPU incurs temperatures exceeding the pre-configured temperature threshold. The mean temperature fault count can be obtained by computing an arithmetic mean of all the GPU temperature counts.

In step S203, method 200 determines that the GPU is to malfunction and concludes. In particular, determining that the GPU is to malfunction is to predict that the GPU will enter into a malfunction state in the future. Therefore, before the GPU indeed enters into a malfunction state, the GPU can be replaced in advance, or the programs executing on the GPU can be migrated to the other GPUs for execution, without affecting the normal business operations. Further, after it is determined that the GPU is to malfunction, alerts can be provided by use of sound alerts (e.g., beeps, etc.), phrase alerts (e.g., hints, etc.), voice alerts, or the like.

In step S204, method 200 determines that the GPU is not malfunction and proceeds to step S102 of FIG. 1. In particular, when it is determined that the GPU is not to malfunction, step S102 is executed such that to continue to monitor the status parameters of the GPU.

Figure 3:
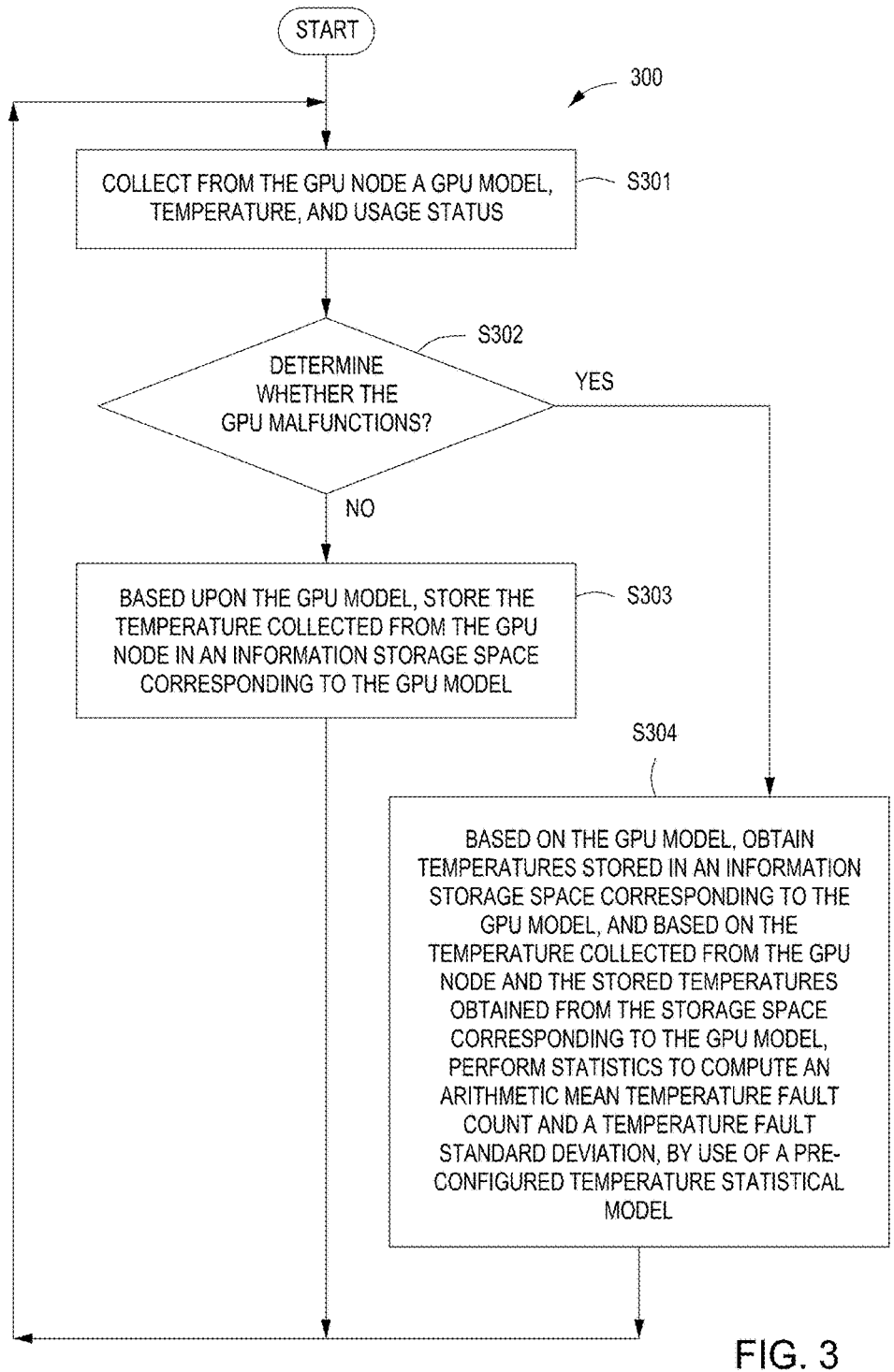
FIG. 3 is a flow chart of a third exemplary method of predicting GPU malfunctions in accordance with an embodiment of the present disclosure.

Referring to FIG. 3, a flow chart of a third exemplary method of predicting GPU malfunctions is shown in accordance with an embodiment of the present disclosure. In particular, in this embodiment, after step S101 where the daemon programs are installed in the GPU nodes, the daemon programs collect periodically from the GPU node the GPU model and GPU status parameters corresponding to the GPU node, according to a pre-determined time period. Step S102, where the GPU status parameters are obtained from the GPU node, includes step S301, where the GPU model, temperature and usage status are obtained.

Step S103, where the mean status fault parameters are obtained by use of statistical models includes steps S302 through S304. In step S302, it is determined whether the GPU malfunctions based on the GPU usage status. If it is determined that the GPU does not malfunction, along the NO path, method 300 executes step S303; otherwise if it is determined that the GPU does malfunction, along the YES path, method 300 executes step S304.

In step S303, based on the GPU model, the GPU temperature obtained from the GPU node is stored in an information storage space corresponding to the GPU model, after which method 300 executes step S301.

In step S304, based on the GPU model, the GPU temperatures are obtained from the information storage space corresponding to the GPU model. Based on the GPU temperature obtained from the GPU node, as well as the stored GPU temperatures which are obtained from the information storage space corresponding to the GPU model, by use of a pre-configured temperature statistical model, statistics are performed separately to obtain a mean temperature fault count and temperature fault standard deviation. Afterwards, method 300 executes step S301.

The pre-configured temperature statistical model includes a mean temperature fault count model and a temperature fault standard deviation model. The mean temperature fault count model is configured to obtain the GPU temperatures from the GPU node and the stored GPU temperatures from the information storage space corresponding to the GPU model such that to compute an arithmetic mean of the temperature counts.

The temperature fault standard deviation model is configured to obtain the GPU temperatures from the GPU node and the stored GPU temperatures from the information storage space corresponding to the GPU model such that, together with the mean temperature count, to compute a temperature fault standard deviation.

In particular, in a hypothetical condition where a GPU of a particular GPU model functions normally, the GPU reaches a pre-configured temperature threshold T. When the GPU of such GPU model malfunctions, there are already n−1 number of the GPUs of the same GPU model have incurred faults, each faulty GPU's respective temperature count of a temperature greater than the temperature T is NT1, NT2, . . . , NTn−1. Based upon the temperature obtained from the GPU node, and the stored GPU temperatures obtained from the information storage space corresponding to the GPU model, it can be determined that the GPU has incurred a temperature greater than T for a number of NTn times. For this particular GPU's model, a mean temperature fault count NT can be computed with the formula: NT=(NT1+NT2+ . . . +NTn)/n; and a temperature fault standard deviation σ(NT) can be computed with the formula:

$$\sigma(NT) = \sqrt{\frac{1}{n}\left(\sum_{j=1}^{n}(NT_i - NT)\right)^2}.$$

In particular, with the computed mean GPU temperature fault count and the temperature fault standard deviation, method 300 continues to execute step S301 such that when there is a new occurrence of GPU fault, a new mean GPU temperature fault count and temperature fault standard deviation can be computed. Therefore, the mean GPU temperature fault count and temperature fault standard deviation can be updated constantly so that the mean GPU temperature fault count and temperature fault standard deviation can be computed with more accuracy, and the prediction of GPU malfunctions can be performed with more accuracy accordingly.

In particular, for GPUs of different GPU models, the status parameters such as temperature corresponding to a malfunction state can vary in a large degree. Therefore, based on the GPU models, a GPU mean temperature fault count and temperature fault standard deviation are computed for each GPU model. Thus, the determining of whether a GPU is to malfunction based upon the GPU temperature count and mean temperature fault count, as well as the temperature fault standard deviation and temperature standard deviation threshold, can be performed with enhanced accuracy.

Figure 4:
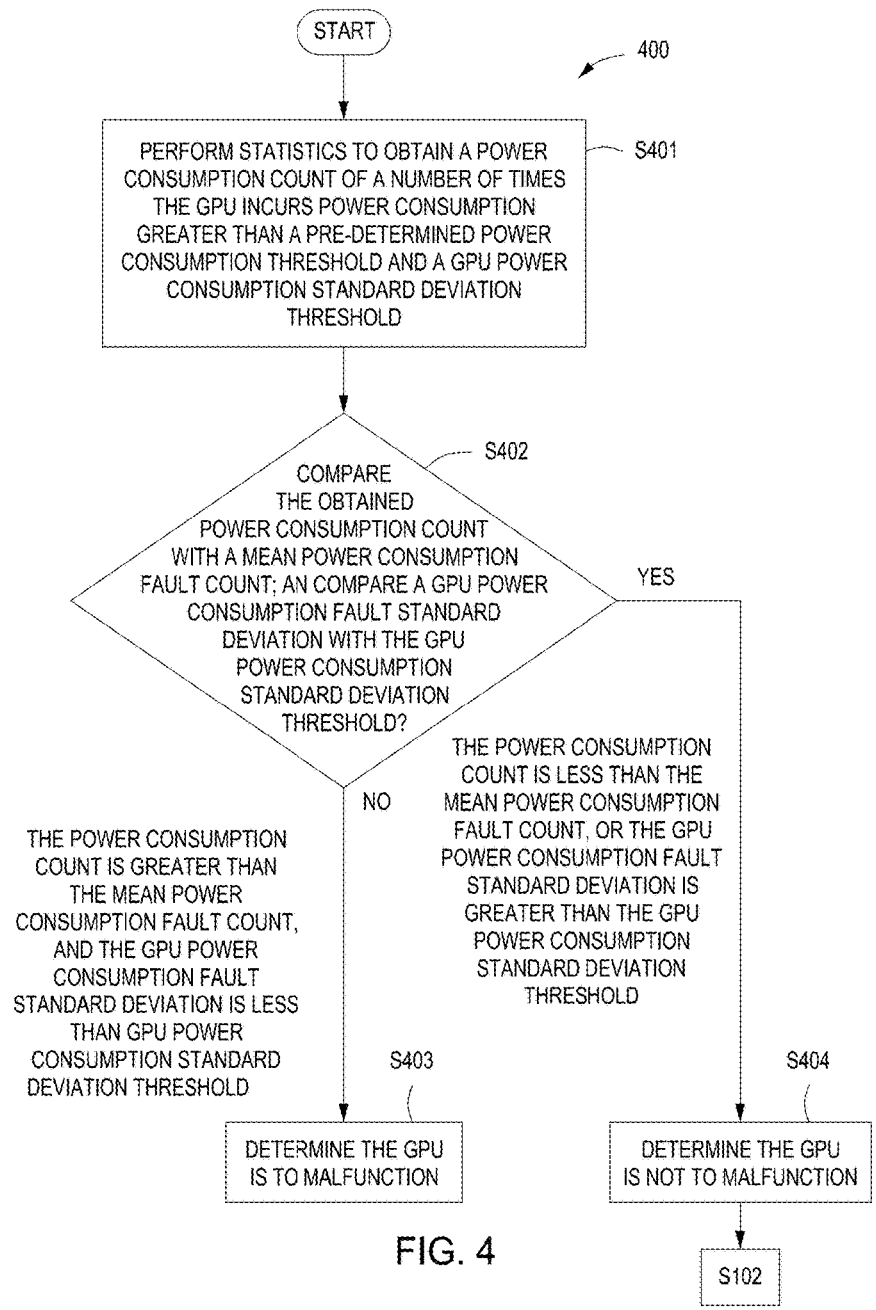
FIG. 4 is a flow chart of a fourth exemplary method of predicting GPU malfunctions in accordance with an embodiment of the present disclosure.

Referring to FIG. 4, a flow chart of a fourth exemplary method of predicting GPU malfunctions is shown in accordance with an embodiment of the present disclosure. In some embodiments, the status parameter is power consumption. Step S103 of comparing the GPU status parameters with the mean status parameters such that to generate a result for determining whether the GPU is about to malfunction includes steps S401 through S404.

In step S401, statistics are performed over the power consumption count, i.e., the number of times the GPU incurs power consumption that is greater than a pre-determined power consumption threshold. The GPU power consumption standard deviation threshold is also obtained.

In particular, based upon the GPU power consumption count and the mean power consumption fault count only, it can be determined whether the GPU is about to enter in a malfunction state. However, in order to increase the accuracy of predicting GPU malfunctions, the power consumption fault standard deviation and power consumption standard deviation threshold can also be utilized in addition to predict GPU malfunctions. In other words, based upon the GPU power consumption count, mean power consumption fault count, as well as power consumption fault standard deviation and power consumption standard deviation threshold, it can be determined whether the GPU is about to malfunction.

Here, the pre-determined power consumption threshold can be configured according to the information such as the maximal power consumption the GPU can possibly incur or the like. The GPU power consumption standard deviation threshold can be configured based upon the practical use experience, or upon multiple experiments or the like. The pre-configured power consumption threshold, GPU power consumption standard deviation threshold can be stored in a one-to-one mapping relationship corresponding to the GPU in a correspondent storage space for retrieval at a time when such information is needed.

In step S402, the GPU power consumption count is compared to the mean power consumption fault count, the power consumption fault standard deviation is compared to the power consumption standard deviation threshold. If the GPU power consumption count is greater than the mean power consumption fault count, and the power consumption fault standard deviation is less than the power consumption standard deviation threshold, method 400 executes steps S403. If the GPU power consumption count is less than the mean power consumption fault count, or the power consumption fault standard deviation is greater than the power consumption standard deviation threshold, method 400 executes steps S404.

In particular, based on the practical use experience the mean power consumption fault count can be configured. It can also be configured by performing statistics over the GPUs that have already incurred faults to obtain the mean power consumption fault count. For example, statistics can be performed for each faulty GPU to compute the power consumption counts, i.e., the number of times the GPU incurs power consumption exceeding the pre-configured power consumption threshold. The mean power consumption fault count can be obtained by computing an arithmetic mean of all the GPU power consumption counts.

In step S403, method 400 determines that the GPU is to malfunction and concludes. In particular, determining that the GPU is to malfunction is to predict that the GPU is likely to enter a malfunction state. Therefore, before the GPU malfunctions, the GPU can be replaced in advance, or the programs executing on the GPU can be migrated to the other GPUs for execution, without affecting the normal business operations. Further, after it is determined that the GPU is to malfunction, alerts can be provided by use of sound alerts (e.g., beeps, etc.), phrase alerts (e.g., hints, etc.), voice alerts, or the like.

In step S404, it is determined that the GPU is not to malfunction, method 400 proceeds to step S102. In particular, if the GPU is determined not to malfunction, step S102 is executed such that to continue to monitor the status parameters of the GPU.

Figure 5:
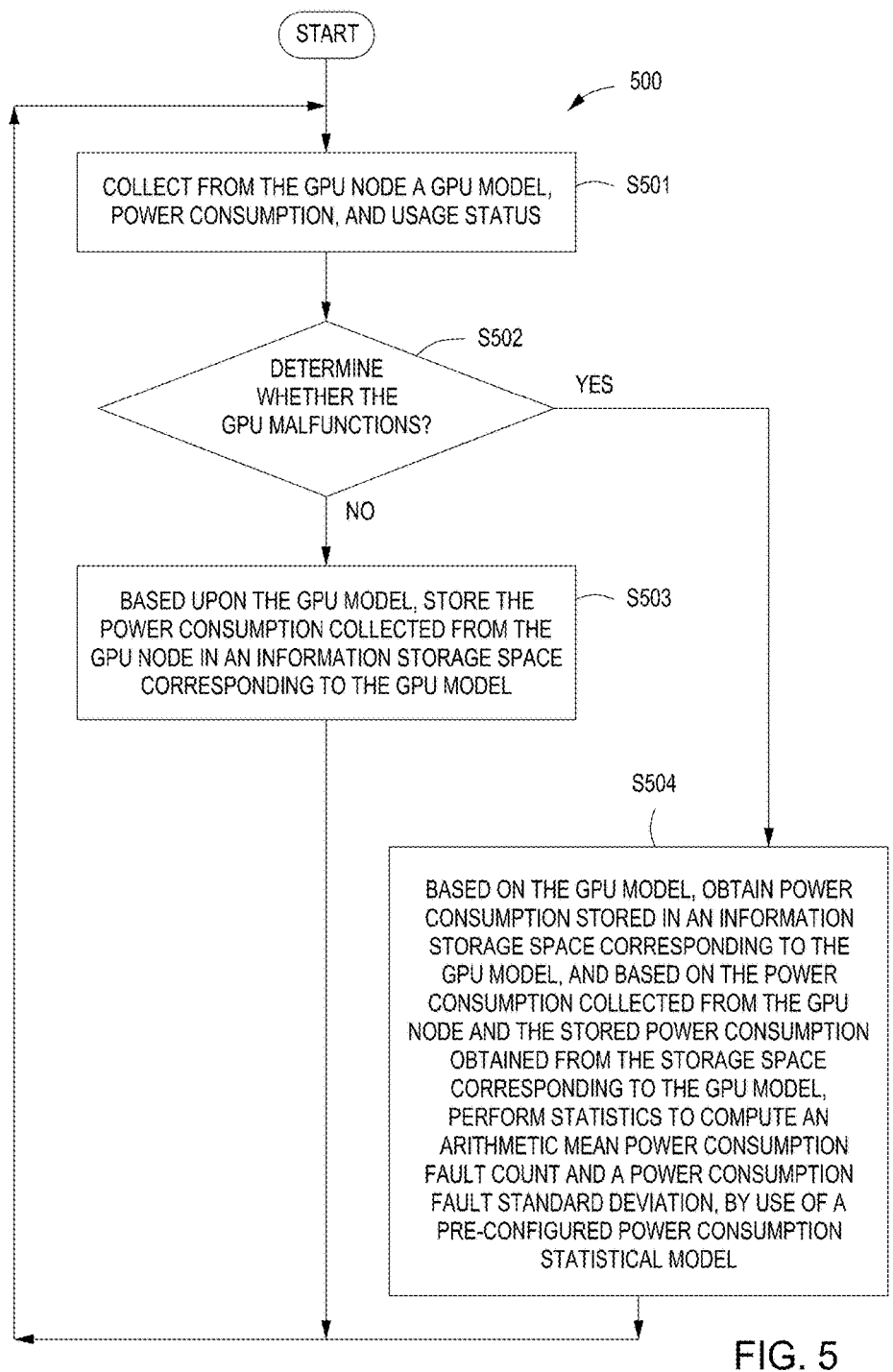
FIG. 5 is a flow chart of a fifth exemplary method of predicting GPU malfunctions in accordance with an embodiment of the present disclosure.

Referring to FIG. 5, a flow chart of a fifth exemplary method of predicting GPU malfunctions is shown in accordance with an embodiment of the present disclosure. In particular, in this embodiment, after step S101 where the daemon programs are installed in the GPU nodes, the daemon programs collect periodically from the GPU node the GPU model and GPU status parameters corresponding to the GPU node, according to a pre-determined time period. Step S102, where the GPU status parameters are obtained from the GPU node, includes step S501, where the GPU model, power consumption and usage status are obtained.

Step S103, where the mean status fault parameters are obtained by use of statistical models includes steps S502 through S504. In step S502, it is determined whether the GPU malfunctions based on the GPU usage status. If it is determined that GPU does not malfunction, along the NO path, method 500 executes step S503; otherwise if it is determined that the GPU does malfunction, along the YES path, method 500 executes step S504.

In step S503, based on the GPU model, the GPU power consumption obtained from the GPU node is stored in an information storage space corresponding to the GPU model, after which method 500 executes step S501.

In step S504, based on the GPU model, the GPU power consumption are obtained from the information storage space corresponding to the GPU model. Based on the GPU power consumption obtained from the GPU node, as well as the stored GPU power consumption which is obtained from the information storage space corresponding to the GPU model, by use of a pre-configured power consumption statistical model, statistics are performed separately to obtain a mean power consumption fault count and power consumption fault standard deviation. Afterwards, method 500 executes step S501.

The pre-configured power consumption statistical model includes a mean power consumption fault count model and a power consumption fault standard deviation model. The mean power consumption fault count model is configured to obtain the GPU power consumption from the GPU node and the stored GPU power consumption from the information storage space corresponding to the GPU model such that to compute an arithmetic mean of the power consumption counts.

The power consumption fault standard deviation model is configured to obtain the GPU power consumption from the GPU node and the stored GPU power consumption from the information storage space corresponding to the GPU model such that, together with the mean power consumption count, to compute a power consumption fault standard deviation.

In particular, in a hypothetical condition where a GPU of a particular GPU model functions normally, the GPU reaches a pre-configured power consumption threshold W. When the GPU of such GPU model malfunctions, there are already n−1 number of the GPUs of the same GPU model have incurred faults, each faulty GPU's respective power consumption count of power consumption greater than the power consumption W is NW1, NW2, . . . , NWn−1. Based upon the power consumption obtained from the GPU node, and the stored GPU power consumption s obtained from the information storage space corresponding to the GPU model, it can be determined that the GPU has incurred power consumption greater than W for a number of NWn times. For this particular GPU's model, a mean power consumption fault count NW can be computed with the formula: NW=(NW1+NW2+ . . . +NWn)/n; and a power consumption fault standard deviation σ(NW) can be computed with the formula:

$$\sigma(NW) = \sqrt{\frac{1}{n}\left(\sum_{i=1}^{n}(NW_i - NW)\right)^2}.$$

In particular, with the computed mean GPU power consumption fault count and the power consumption fault standard deviation, method 500 continues to execute step S501 such that when there is a new occurrence of GPU fault, a new mean GPU power consumption fault count and power consumption fault standard deviation can be computed. Therefore, the mean GPU power consumption fault count and power consumption fault standard deviation can be updated constantly so that the mean GPU power consumption fault count and power consumption fault standard deviation can be computed with more accuracy, and the prediction of GPU malfunctions can be performed with more accuracy accordingly.

In particular, for GPUs of different GPU models, the status parameters such as power consumption corresponding to a malfunction state can vary in a large degree. Therefore, based on the GPU models, a GPU mean power consumption fault count and power consumption fault standard deviation are computed for each GPU model. Thus, the determining of whether a GPU is to malfunction based upon the GPU power consumption count and mean power consumption fault count, as well as the power consumption fault standard deviation and power consumption standard deviation threshold, can be performed with enhanced accuracy.

Figure 6:
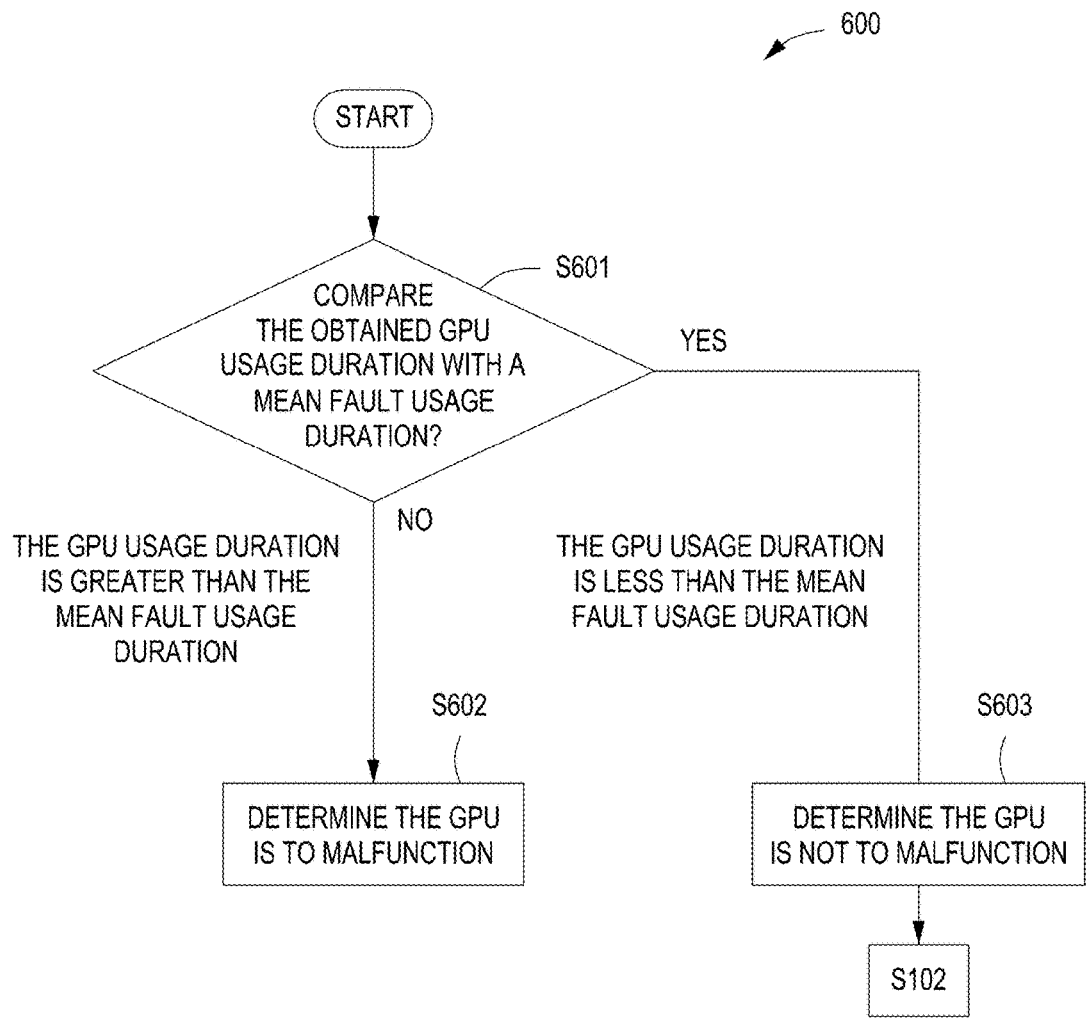
FIG. 6 is a flow chart of a sixth exemplary method of predicting GPU malfunctions in accordance with an embodiment of the present disclosure.

Referring to FIG. 6, a flow chart of a sixth exemplary method of predicting GPU malfunctions is shown in accordance with an embodiment of the present disclosure. In some embodiments, the status parameter is usage duration. Step S103, where the GPU status parameters are compared to the mean status fault parameters, the result of which is utilized to determine whether the GPU is about to malfunction, can include steps S601 through S603. Method 600 starts in step S601, where the GPU usage duration is compared to a mean fault usage duration. If the GPU usage duration is greater than the mean fault usage duration, method 600 proceeds to step S602. If the GPU usage duration is less than the mean fault usage duration, method 600 proceeds to step S603.

In step S602, method 600 determines that the GPU is to enter a malfunction state and concludes. In particular, determining that the GPU is to malfunction is to predict that the GPU is likely to enter a malfunction state in the future. Therefore, before the GPU malfunctions, the GPU can be replaced in advance, or the programs executing on the GPU can be migrated to the other GPUs for execution, without affecting the normal business operations. Further, after it is determined that the GPU is to malfunction, alerts can be provided by use of sound alerts (e.g., beeps, etc.), phrase alerts (e.g., hints, etc.), voice alerts, or the like.

In step S603, method 600 determines that the GPU is not to malfunction and proceeds to step S102. In particular, when it is determined that the GPU is not to malfunction, step S102 is executed such that to continue to monitor the status parameters of the GPU.

Figure 7:
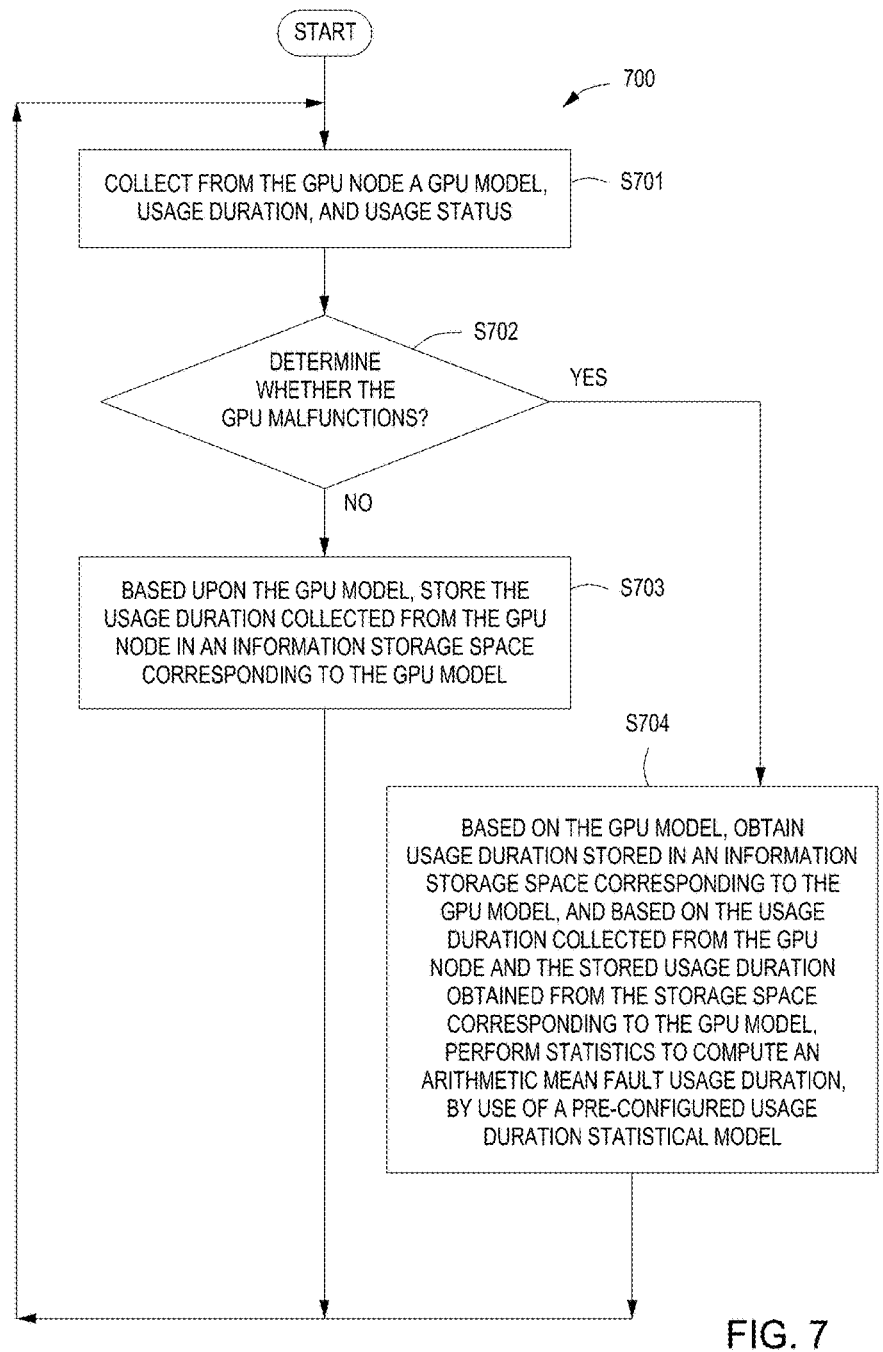
FIG. 7 is a flow chart of a seventh exemplary method of predicting GPU malfunctions in accordance with an embodiment of the present disclosure.

Referring to FIG. 7, a flow chart of a seventh exemplary method of predicting GPU malfunctions is shown in accordance with an embodiment of the present disclosure. In particular, in this embodiment, after step S101 where the daemon programs are installed in the GPU nodes, the daemon programs collect periodically from the GPU node the GPU model and GPU status parameters corresponding to the GPU node, according to a pre-determined time period. Step S102, where the GPU status parameters are obtained from the GPU node, includes step S701, where the GPU model, usage duration and usage status are obtained.

The obtaining of the mean status fault parameters by use of statistical models includes steps S702 through S704. In step S702, it is determined whether the GPU malfunctions based on the GPU usage status. If it is determined that GPU does not malfunction, along the NO path, method 700 executes step S703; otherwise if it is determined that the GPU does malfunction, along the YES path, method 700 executes step S704.

In step S703, based on the GPU model, the GPU usage duration obtained from the GPU node is stored in an information storage space corresponding to the GPU model, after which method 700 executes step S701.

In step S704, based on the GPU model, the GPU usage duration are obtained from the information storage space corresponding to the GPU model. Based on the GPU usage duration obtained from the GPU node, as well as the stored GPU usage duration which is obtained from the information storage space corresponding to the GPU model, by use of a pre-configured usage duration statistical model, statistics are performed obtain a mean fault usage duration. Afterwards, method 700 executes step S701.

Here, the pre-configured usage duration statistical model includes a mean fault usage duration model. The mean fault usage duration model is configured to obtain the GPU usage duration from the GPU node and the stored GPU usage duration from the information storage space corresponding to the GPU model such that to compute an arithmetic mean of the usage duration.

In particular, in a hypothetical condition where a GPU of a particular GPU model malfunctions, there are already n−1 number of the GPUs of the same GPU model have incurred faults, each faulty GPU's respective usage duration is $NS_1$, $NS_2$, . . . , $NS_{n-1}$. Based upon the GPU usage duration obtained from the GPU node, and the stored GPU usage duration obtained from the information storage space corresponding to the GPU model, it can be determined that, for this particular GPU's model, a mean fault usage duration NS can be computed with the formula: $NS=(NS_1+NS_2+ \ldots +NS_n)/n$.

In particular, with the computed mean GPU fault usage duration, method 700 continues to execute step S701 such that when there is a new occurrence of GPU fault, a new mean GPU fault usage duration can be computed. Therefore, the mean GPU fault usage duration can be updated constantly so that the mean GPU fault usage duration can be computed with more accuracy, and the prediction of GPU malfunctions can be performed with more accuracy accordingly.

In particular, for GPUs of different GPU models, the status parameters such as usage duration corresponding to a malfunction state can vary in a large degree. Therefore, based on the GPU models, a GPU mean fault usage duration is computed for each GPU model. Thus, the determining of whether a GPU is to malfunction, based upon the GPU usage duration and the mean GPU fault usage duration, can be performed with enhanced accuracy.

In accordance with embodiments of the present disclosure, prior to a GPU malfunctions, it can be determined based on the status parameters and mean status fault parameters whether the GPU is to enter a malfunction state. Therefore, before the GPU malfunctions, the GPU can be replaced, or the programs executing on the GPU can be migrated to the other GPUs for execution, without affecting the normal business operations.

Before a GPU incurs faults, based on the GPU temperature count and a mean temperature fault count, power consumption count and a mean power consumption fault count, or usage duration and a mean fault usage duration, etc. to determined whether the GPU is to generate faults. With such prediction in advance whether the GPU is to malfunction, before the GPU faults, the GPU can be replaced in advance, or the programs executing on the GPU can be migrated to the other GPUs for execution, without affecting the normal business operations.

When the GPU temperature count and mean temperature fault count, temperature fault standard deviation and temperature standard deviation threshold are utilized to determine whether the GPU is to malfunction, based on the GPU model, the temperature mean fault count and the temperature fault standard deviation corresponding to the GPU model can be obtained such that to enhance the prediction accuracy.

Similarly, when the GPU power consumption count and mean power consumption fault count, power consumption fault standard deviation and power consumption standard deviation threshold are utilized to determine whether the GPU is to malfunction, based on the GPU model, the power consumption mean fault count and the power consumption fault standard deviation corresponding to the GPU model can be obtained such that to enhance the prediction accuracy.

Further similarly, when the GPU usage duration is utilized to determine whether the GPU is to malfunction, based on the GPU model, the mean GPU usage fault duration corresponding to the GPU model can also be obtained such that to enhance the prediction accuracy.

Figure 8:
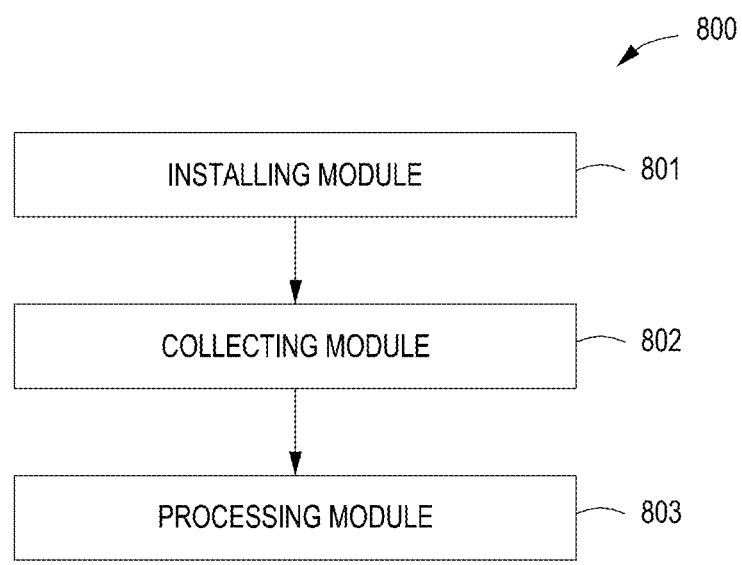
FIG. 8 is a block diagram of an exemplary apparatus for predicting GPU malfunctions in accordance with an embodiment of the present disclosure.

Referring to FIG. 8, a block diagram of an exemplary apparatus for predicting GPU malfunction is shown in accordance with an embodiment of the present disclosure. Apparatus 800 includes an installing module 801, a collecting module 802 and a processing module 803. The installing module 801 is configured to install a daemon program at a GPU node, the daemon program periodically collecting GPU status parameters corresponding to the GPU node at a pre-determined time period.

The collecting module 802 is configured to obtain the GPU status parameters from the GPU node. The processing module 803 is configured to compare the obtained GPU status parameters with mean status fault parameters to determine whether the GPU is to malfunction, where the mean status fault parameters are obtained by use of pre-configured statistical models.

Further, when the status parameter is temperature, the processing module 803 includes a first statistical module, a first comparison module, a first determination module and a second determination module. The first statistical module is configured to perform statistics to obtain a temperature count of a number of times the GPU incurs a temperature greater than a pre-determined temperature threshold and a GPU temperature standard deviation threshold for the GPU. The first comparison module is configured to compare the obtained temperature count with a mean temperature fault count and to compare a GPU temperature standard deviation with the GPU temperature standard deviation threshold.

The first determination module is configured to, if the temperature count is greater than the mean temperature fault count, and if the GPU temperature standard deviation is less than the GPU temperature standard deviation threshold, determine that the GPU is to malfunction. The second determination module is configured to, if the temperature count is less than the mean temperature fault count, or if the GPU temperature standard deviation is greater than the GPU temperature standard deviation threshold, determine that the GPU is not to malfunction.

After the installation module 801 installs the daemon programs on the GPU node, the daemon program periodically collects the GPU model and GPU status parameters corresponding to the GPU node at a pre-determined time period. Correspondingly, the collecting module 802 includes a first collecting module configured to collect the GPU model, temperature and usage status from the GPU node. Also correspondingly, the processing module 803 further includes a first decision module, a first storing module and a first computing module. The first decision module is configured to decide, based on the usage status, whether the GPU malfunctions. The first storing module is configured to, in response to a determination that the GPU does not malfunction, based upon the GPU model, store the temperature collected from the GPU node in an information storage space corresponding to the GPU model.

The first computing module is configured to, in response to a determination that the GPU does malfunction, based on the GPU model, obtaining temperatures stored in an information storage space corresponding to the GPU model, and based on the temperature collected from the GPU node and the stored temperatures obtained from the storage space corresponding to the GPU model, perform statistics to compute an arithmetic mean temperature fault count and a GPU temperatures fault standard deviation, by use of a pre-configured temperature statistical model.

Further, the pre-configured temperature statistical model includes a mean temperature fault count model and a temperature fault standard deviation model. The mean temperature fault count model is configured to compute an arithmetic mean based on the GPU temperature collected from the GPU node and the stored GPU temperatures obtained from the information storage space corresponding to the GPU model.

The temperature fault standard deviation model is configured to compute a temperature fault standard deviation based on the GPU temperature collected from the GPU node and the stored GPU temperatures obtained from the information storage space corresponding to the GPU model, together with the mean temperature fault count.

Furthermore, when the status parameter is power consumption, the processing module 803 includes a second statistical module, a second comparison module, a third determination module and a fourth determination module. The second statistical module is configured to perform statistics to obtain a power consumption count of the number of times the GPU incurs power consumption greater than a pre-determined power consumption threshold and a GPU power consumption standard deviation threshold for the GPU. The second comparison module is configured to compare the obtained power consumption count with a mean power consumption fault count and to compare a GPU power consumption fault standard deviation with the GPU power consumption standard deviation threshold.

The third determination module is configured to, if the power consumption count is greater than the mean power consumption fault count, and if the GPU power consumption fault standard deviation is less than the GPU power consumption standard deviation threshold, determine that the GPU is to malfunction. The fourth determination module is configured to, if the power consumption count is less than the mean power consumption fault count, and or the GPU power consumption fault standard deviation is greater than the GPU power consumption standard deviation threshold, determine that the GPU is not to malfunction.

After the installation module 801 installs the daemon programs on the GPU node, the daemon program periodically collects the GPU model and GPU status parameters corresponding to the GPU node at a pre-determined time period. Correspondingly, the collecting module 802 includes a second collecting module configured to collect from the GPU node a GPU model, power consumption, and usage status. Also correspondingly, the processing module 803 further includes a second decision module, a second storing module and a second computing module.

The second decision module is configured to, based on the usage status, decide whether the GPU malfunctions. The second storing module is configured to, in response to a determination that the GPU does not malfunction, based upon the GPU model, store the power consumption collected from the GPU node in an information storage space corresponding to the GPU model.

The second computing module is configured to, in response to a determination that the GPU does malfunction, based on the GPU model, obtain power consumption stored in an information storage space corresponding to the GPU model. Based on the power consumption collected from the GPU node and the stored power consumption obtained from the storage space corresponding to the GPU model, the second computing module is configured to perform statistics to compute an arithmetic mean power consumption fault count and a power consumption fault standard deviation, by use of a pre-configured power consumption statistical model.

The pre-configured power consumption statistical model includes a mean power consumption fault count model and a power consumption fault standard deviation model. The mean power consumption fault count model is configured to compute an arithmetic mean based on the GPU temperature collected from the GPU node and the stored GPU temperatures obtained from the information storage space corresponding to the GPU model.

The power consumption fault standard deviation model is configured to compute a power consumption fault standard deviation based on the GPU power consumption collected from the GPU node and the stored GPU power consumption obtained from the information storage space corresponding to the GPU model, together with the mean power consumption fault count.

When the status parameter is usage duration, the processing module 803 includes a third comparison module, a fifth determination module and a sixth determination module. The third comparison module is configured to compare the obtained GPU usage duration with a mean fault usage duration. The fifth determination module is configured to, if the GPU usage duration is greater than the mean fault usage duration, determine the GPU is to malfunction. The sixth determination module is configured to, if the GPU usage duration is less than the mean fault usage duration, determine the GPU is not to malfunction.

After the installation module 801 installs the daemon programs on the GPU node, the daemon program periodically collects the GPU model and GPU status parameters corresponding to the GPU node at a pre-determined time period. Correspondingly, the collecting module 802 includes a third collecting module configured to collect from the GPU node a GPU model, usage duration, and usage status. Also correspondingly, the processing module 803 further includes a third decision module, a third storing module and a third computing module. The third decision module is configured to, based on the usage status, decide whether the GPU malfunctions. The third storing module is configured to, in response to a determination that the GPU does not malfunction, based upon the GPU model, store the usage duration collected from the GPU node in an information storage space corresponding to the GPU model.

The third computing module is configured to, in response to a determination that the GPU does malfunction, based on the GPU model, obtain usage duration stored in an information storage space corresponding to the GPU model. Based on the usage duration collected from the GPU node and the stored usage duration obtained from the storage space corresponding to the GPU model, the third computing module is configured to perform statistics to compute an arithmetic mean fault usage duration, by use of a pre-configured usage duration statistical model.

The pre-configured usage duration statistical model includes a mean fault usage duration model configured to compute an arithmetic mean based on the GPU usage duration collected from the GPU node and the stored GPU usage duration obtained from the information storage space corresponding to the GPU model.

Embodiments of the present disclosure can be implemented using software, hardware, firmware, and/or the combinations thereof. Regardless of being implemented using software, hardware, firmware or the combinations thereof, instruction code can be stored in any kind of computer readable media (for example, permanent or modifiable, volatile or non-volatile, solid or non-solid, fixed or changeable medium, etc.). Similarly, such medium can be implemented using, for example, programmable array logic (PAL), random access memory (RAM), programmable read only memory (PROM), read only memory (ROM), electrically erasable programmable ROM (EEPROM), magnetic storage, optical storage, digital versatile disc (DVD), or the like.

It is necessary to point out that, modules or blocks described by embodiments of the present disclosures are logical modules or logical blocks. Physically, a logical module or logical block can be a physical module or a physical block, a part of a physical module or a physical block, or the combinations of more than one physical modules or physical blocks. Physical implementation of those logical module or logical blocks is not of essence. The realized functionalities realized by the modules, blocks and the combinations thereof are key to solving the problems addressed by the present disclosure. Further, in order to disclose the novelties of the present disclosure, the above described embodiments do not disclose about those modules or blocks not too related to solving the problems addressed by the present disclosure, which does not mean that the above described embodiments cannot include other modules or blocks.

It is also necessary to point out that, in the claims and specification of the present disclosure, terms such as first and second only are for distinguishing an embodiment or an operation from another embodiment or operation. It does not require or imply that those embodiments or operations having any such real relationship or order. Further, as used herein, the terms "comprising," "including," or any other variation intended to cover a non-exclusive inclusion, such that a process, method, article, or apparatus that comprises a list of elements does not include only those elements but may include other elements not expressly listed or inherent to such process, method, article, or apparatus. Absent further limitation, elements recited by the phrase "comprising a" does not exclude a process, method, article, or apparatus that comprises such elements from including other same elements.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable medium used to actually carry out the distribution. The embodiments disclosed herein may also be implemented using software modules that perform certain tasks. These software modules may include script, batch, or other executable files that may be stored on a computer-readable storage media or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present disclosure and its advantages have been described in detail, it should be understood that various changes substitutions, and alterations can be made herein without departing from the spirit and scope of the disclosure as defined by the appended claims. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

What is claimed is:

1. A method of predicting GPU malfunctions in a cluster of GPUs, the method comprising:
    collecting a plurality of measurements of a condition of a first GPU in the cluster of GPUs during a pre-determined time period;
    determining a GPU count that represents how many of the measurements of the condition exceeded a threshold value during the pre-determined time period, and obtaining a mean fault count;
    determining a GPU standard deviation based on the plurality of measurements of the condition collected during the pre-determined time and a plurality of measurements of the condition previously collected from the first GPU;
    detecting when the GPU count is greater than the mean fault count, and the GPU standard deviation is less than a fault standard deviation threshold; and
    migrating an application program executing on the first GPU to a second GPU in the cluster of GPUs in response to detecting when the GPU count exceeds the mean fault count and the GPU standard deviation falls below the fault standard deviation threshold.

2. The method of claim 1, wherein:
    the condition is temperature;
    the plurality of measurements collected from the first GPU during the pre-determined time period include a plurality of currently-collected temperature measurements, and the plurality of measurements of the condition previously collected from the first GPU include a plurality of previously-collected temperature measurements;
    the GPU count represents how many temperature measurements exceeded a temperature threshold; and
    the GPU standard deviation is based on the plurality of currently-collected temperature measurements and the plurality of previously-collected temperature measurements.

3. The method of claim 2, wherein the fault count is a mean count based on the plurality of currently-collected temperature measurements and the plurality of previously-collected temperature measurements.

4. The method of claim 3, wherein the fault standard deviation threshold is an assigned value based on experience.

5. The method of claim 1, wherein:
    the condition is power consumption;
    the plurality of measurements collected from the first GPU during the pre-determined time period include a plurality of currently-collected power consumption measurements, and the plurality of measurements of the condition previously collected from the first GPU include a plurality of previously-collected power consumption measurements;
    the GPU count represents how many power consumption measurements exceeded a power consumption threshold; and
    the GPU standard deviation is based on the plurality of currently-collected power consumption measurements, and the plurality of previously-collected power consumption measurements.

6. The method of claim 5, wherein the fault count is a mean count based on the plurality of currently-collected power consumption measurements collected during the pre-determined time and the plurality of previously-collected power consumption measurements.

7. The method of claim 6, wherein the fault standard deviation threshold is an assigned value based on experience.

8. A method of predicting GPU malfunctions in a cluster of GPUs, the method comprising:
    collecting a GPU usage duration of a first GPU in the cluster of GPUs during a pre-determined time period;
    detecting when the GPU usage duration is greater than a fault usage duration; and
    migrating an application program executing on the first GPU to a second GPU in the cluster of GPUs in response to detecting when the GPU usage duration is greater than the fault usage duration.

9. The method of claim 8, wherein the GPU usage duration is a mean duration based on the GPU usage duration collected during the pre-determined time and a plurality of GPU usage durations previously collected from the first GPU.

10. The method of claim 9, wherein the plurality of GPU usage durations previously collected from the first GPU are stored in an information storage space as a plurality of stored measurements that correspond to the GPU.

11. An apparatus for predicting GPU malfunctions in a cluster of GPUs, the apparatus comprising:
    a processor; and
    a non-transitory computer-readable medium coupled to the processor, the non-transitory computer-readable medium having computer-readable instructions stored thereon to be executed when accessed by the processor, the instructions comprising:
    collecting a plurality of measurements of a condition of a first GPU in the cluster of GPUs during a pre-determined time period;
    determining a GPU count that represents how many of the measurements of the condition exceeded a threshold value during the pre-determined time period;
    determining a GPU standard deviation based on the plurality of measurements of the condition collected during the pre-determined time and a plurality of measurements of the condition previously collected from the first GPU;
    detecting when the GPU count is greater than a fault count, and the GPU standard deviation is less than a fault standard deviation threshold; and
    migrating an application program executing on the first GPU to a second GPU in the cluster of GPUs in response to detecting when the GPU count exceeds the fault count and the GPU standard deviation falls below the fault standard deviation threshold.

12. The apparatus of claim 11, wherein:
    the condition is temperature;
    the plurality of measurements collected from the first GPU during the pre-determined time period include a plurality of currently-collected temperature measurements, and the plurality of measurements of the condition previously collected from the first GPU include a plurality of previously-collected temperature measurements;
    the GPU count represents how many temperature measurements exceeded a temperature threshold; and
    the GPU standard deviation is based on the plurality of currently-collected temperature measurements and the plurality of previously-collected temperature measurements.

13. The apparatus of claim 12, wherein the fault count is a mean count based on the plurality of currently-collected temperature measurements and the plurality of previously-collected temperature measurements.

14. The apparatus of claim 13, wherein the fault standard deviation threshold is an assigned value based on experience.

15. The apparatus of claim 11, wherein:
the condition is power consumption;
the plurality of measurements collected from the first GPU during the pre-determined time period include a plurality of currently-collected power consumption measurements, and the plurality of measurements of the condition previously collected from the first GPU include a plurality of previously-collected power consumption measurements;
the GPU count represents how many power consumption measurements exceeded a power consumption threshold; and
the GPU standard deviation is based on the plurality of currently-collected power consumption measurements, and the plurality of previously-collected power consumption measurements.

16. The apparatus of claim 15, wherein the fault count is a mean count based on the plurality of currently-collected power consumption measurements collected during the pre-determined time and the plurality of previously-collected power consumption measurements.

17. The apparatus of claim 16, wherein the fault standard deviation threshold is an assigned value based on experience.

18. An apparatus for predicting GPU malfunctions in a cluster of GPUs, the apparatus comprising:
a processor; and
a non-transitory computer-readable medium coupled to the processor, the non-transitory computer-readable medium having computer-readable instructions stored thereon to be executed when accessed by the processor, the instructions comprising:
collecting a GPU usage duration of a first GPU in the cluster of GPUs during a pre-determined time period;
detecting when the GPU usage duration is greater than a fault usage duration; and
migrating an application program executing on the first GPU to a second GPU in the cluster of GPUs in response to detecting when the GPU usage duration is greater than the fault usage duration.

19. The apparatus of claim 18, wherein the GPU usage duration is a mean duration based on the GPU usage duration collected during the pre-determined time and a plurality of GPU usage durations previously collected from the first GPU.

20. The apparatus of claim 19, wherein the plurality of GPU usage durations previously collected from the first GPU are stored in an information storage space as a plurality of stored measurements that correspond to the first GPU.

* * * * *